United States Patent
Ryu et al.

(10) Patent No.: US 10,212,360 B2
(45) Date of Patent: Feb. 19, 2019

(54) ACTUATOR AND DRIVING APPARATUS OF CAMERA MODULE

(71) Applicant: SAMSUNG ELECTRO-MECHANICS CO., LTD., Suwon-si (KR)

(72) Inventors: Je Hyuk Ryu, Suwon-si (KR); Jong Woo Lee, Suwon-si (KR); Yong Woon Ji, Suwon-si (KR); Byung Joo Hong, Suwon-si (KR); Joo Yul Ko, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 15/796,008

(22) Filed: Oct. 27, 2017

(65) Prior Publication Data

US 2018/0278853 A1    Sep. 27, 2018

(30) Foreign Application Priority Data

Mar. 27, 2017 (KR) .......... 10-2017-0038372

(51) Int. Cl.
*H04N 5/243* (2006.01)
*H04N 5/225* (2006.01)
(Continued)

(52) U.S. Cl.
CPC .......... *H04N 5/243* (2013.01); *H04N 5/2252* (2013.01); *H04N 5/2253* (2013.01);
(Continued)

(58) Field of Classification Search
CPC ..................................... H04N 5/243
(Continued)

(56) References Cited

U.S. PATENT DOCUMENTS

| 4,697,127 A * | 9/1987 | Stich ............. G05D 3/1454 318/561 |
| 2002/0186625 A1* | 12/2002 | Hung ............. G11B 7/08511 369/44.29 |
| 2014/0111132 A1 | 4/2014 | Youm |

FOREIGN PATENT DOCUMENTS

JP         2-144606 A      6/1990
KR   10-2013-0077216 A    7/2013
(Continued)

OTHER PUBLICATIONS

Korean Office Action dated Oct. 22, 2018 in corresponding Korean Patent Application No. 10-2017-0038372 (9 pages in English and 6 pages in Korean).

*Primary Examiner* — Joel W Fosselman
(74) *Attorney, Agent, or Firm* — NSIP Law (57) ABSTRACT

An actuator of a camera module including a magnet, a driving coil facing the magnet, a driving apparatus including a driving circuit configured to apply a driving signal to the driving coil to move the magnet, and a position calculator configured to generate a feedback signal based on a current position of the magnet, wherein the driving apparatus is further configured to calculate an error value by comparing an input signal with the feedback signal, and to determine a control gain of a control signal provided to the driving circuit according to the error value, and wherein the control gain is reduced in response to an increase in the error value, and the control gain is increased in response to a decrease in the error value.

19 Claims, 3 Drawing Sheets

(51) Int. Cl.
*G05B 11/42* (2006.01)
*H04N 5/232* (2006.01)

(52) U.S. Cl.
CPC .......... _H04N 5/2254_ (2013.01); *G05B 11/42* (2013.01); *H04N 5/23264* (2013.01)

(58) Field of Classification Search
USPC ........................................................ 348/357
See application file for complete search history.

(56) References Cited

FOREIGN PATENT DOCUMENTS

| | | |
|---|---|---|
| KR | 10-2014-0049726 A | 4/2014 |
| KR | 10-2015-0097998 A | 8/2015 |
| KR | 10-1547291 B1 | 8/2015 |

\* cited by examiner

ACTUATOR AND DRIVING APPARATUS OF CAMERA MODULE

CROSS-REFERENCE TO RELATED APPLICATION(S)

This application claims the benefit under 35 USC § 119(a) of Korean Patent Application No. 10-2017-0038372 filed on Mar. 27, 2017 in the Korean Intellectual Property Office, the entire disclosure of which is incorporated herein by reference for all purposes.

BACKGROUND

1. Field

The present disclosure relates to an actuator and a driving apparatus of a camera module.

2. Description of Related Art

Portable communication devices such as mobile phones, personal digital assistants (PDAs), portable PCs have the ability to send video data, as well as sending text or voice data. Recently, camera modules have also been incorporated in portable communication terminals to allow for video data to be captured as well as video chatting.

A camera module generally includes a lens barrel having a lens, a housing accommodating the lens barrel, and an image sensor converting an image of a subject into an electrical signal. In an example, a short focal length type camera module imaging an object at a fixed focal point may be employed as the camera module. Recently, in line with the advancement of technology, a camera module including an actuator available for auto-focusing has been employed. In addition, the camera module may also employ an actuator for optical image stabilization (OIS) to reduce a degradation of resolution due to camera shake.

A reduction in the thickness of mobile devices limits a movement range of a lens barrel of a camera module in an optical axis direction. When a control gain is uniformly maintained in the camera module, which is limited in terms of movement range, a rise time is increased due to frictional force, or overshoot may occur due to acceleration.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided an actuator of a camera module, the actuator including a magnet, a driving coil facing the magnet, a driving apparatus including a driving circuit configured to apply a driving signal to the driving coil to move the magnet, and a position calculator configured to generate a feedback signal based on a current position of the magnet, wherein the driving apparatus is further configured to calculate an error value by comparing an input signal with the feedback signal, and to determine a control gain of a control signal provided to the driving circuit according to the error value, and wherein the control gain is reduced in response to an increase in the error value, and the control gain is increased in response to a decrease in the error value.

The error value may be inversely proportional to the control gain.

The control gain may be reduced exponential functionally in response to the increase in the error value.

The driving apparatus may include a proportional-integral-derivative (PID) controller configured to generate the control signal.

The driving apparatus may be configured to determine each of a proportional control gain, an integral control gain, and a derivative control gain of the PID controller.

The driving apparatus may be driven in a closed loop manner to reduce the error value corresponding to a difference between the input signal and the feedback signal.

The input signal may include a target position of the magnet.

The input signal may be provided from an image processor including an auto-focusing algorithm.

The driving apparatus may be configured to provide the driving signal in a voice coil motor manner to the driving coil.

The position calculator may be configured to generate an oscillation signal that may be varied in frequency according to movement of the magnet, and to calculate the current position of the magnet according to a frequency of the oscillation signal.

The position calculator may include a sensing coil configured to determine a frequency of the oscillation signal.

The position calculator may include a capacitor forming an oscillation circuit with the sensing coil.

The position calculator may include a resister forming an oscillation circuit with the sensing coil.

The actuator may include a pigment formed of a magnetic substance or a magnetic material with high magnetic permeability disposed between the magnet and the sensing coil.

The frequency of the oscillation signal may be determined based on an inductance of the sensing coil.

In another general aspect, there is provided a driving apparatus of a camera module, the driving apparatus including a comparator configured to compare a current position of a magnet with a target position to calculate an error value, a controller configured to generate a control signal according to the error value, a control gain determiner configured to determine a control gain of the control signal according to the error value, and a driving circuit unit configured to provide a driving signal to a driving coil based on the control signal, wherein the control gain determiner is further configured to reduce the control gain in response to an increase in the error value is increased, and to reduce the control gain in response to a decrease in the error value.

The error value may be inversely proportional to the control gain.

The control gain may be reduced exponential functionally, in response to an increase in the error value.

The controller may include a proportional-integral-derivative (PID) controller, and the control gain determiner may be configured to determine each of a proportional control gain, an integral control gain, and a derivative control gain of the PID controller.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after gaining a thorough an understanding of the disclosure of this application. For example, the sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known in the art maybe omitted for increased clarity and conciseness.

Throughout the specification, when an element, such as a layer, region, or wafer (substrate), is described as being "on," "connected to," or "coupled to" another element, it can be directly "on," "connected to," or "coupled to" the other element, or there may be other elements intervening therebetween. In contrast, when an element is referred to as being "directly on," "directly connected to," or "directly coupled to" another element, there can be no other elements or layers intervening therebetween. As used herein, the term "and/or" includes any and all combinations of one or more of the associated listed items.

Although terms such as "first," "second," and "third" maybe used herein to describe various members, components, regions, layers, and/or sections, these members, components, regions, layers, and/or sections are not to be limited by these terms. Rather, these terms are only used to distinguish one member, component, region, layer, or section from another member, component, region, layer, or section. Thus, a first member, component, region, layer, or section referred to in an example below could also be referred to as a second member, component, region, layer, or section without departing from the teachings of the example.

Spatially relative terms, such as "above," "upper," "below," and "lower," may be used herein for ease of description to describe one element's relationship to another element as shown in the figures. Such spatially relative terms are intended to encompass different orientations of the device in use or operation in addition to the orientation depicted in the figures. For example, if the device in the figures is turned over, elements described as "above" or "upper" relative to other elements would then be oriented "below" or "lower" relative to the other elements. Thus, the term "above" can encompass both the above and below orientations depending on a particular direction of the figures. The device may be otherwise oriented (rotated 90 degrees or at other orientations), and the spatially relative terms used herein are to be interpreted accordingly.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Figure 1:
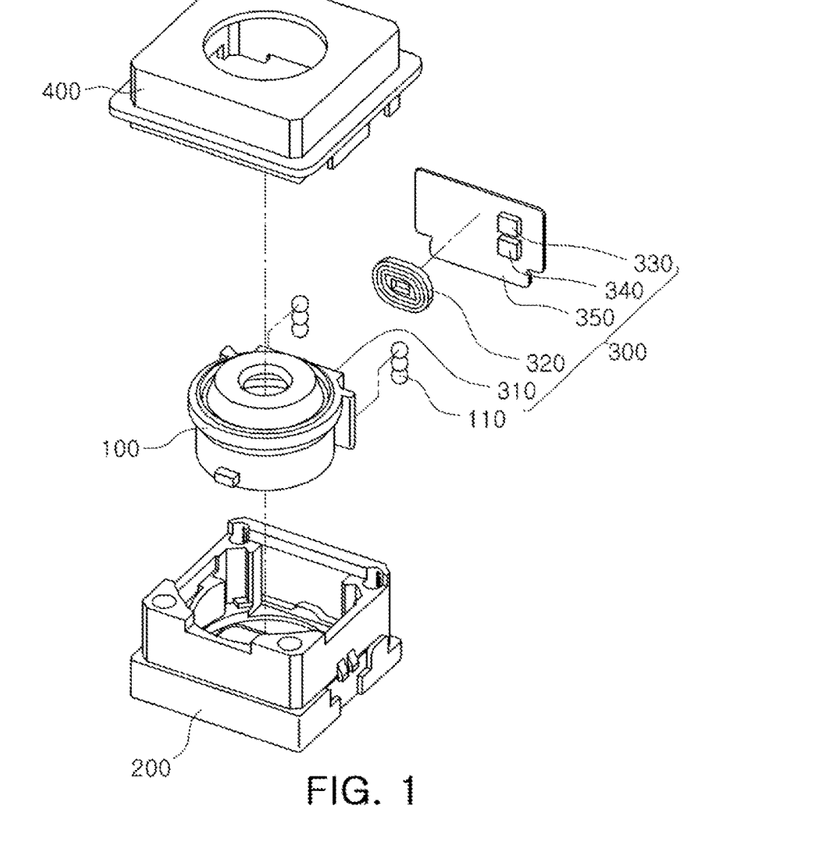
FIG. 1 is a diagram illustrating an example of a camera module.

FIG. 1 is a diagram illustrating an example of a camera module.

Referring to FIG. 1, a camera module includes a lens barrel 100, a housing 200, an actuator 300, and a case 400.

In an example, the lens barrel 100 has a hollow cylindrical shape to accommodate at least one lens, which images a subject. The lens is provided in the lens barrel 100 according to an optical axis. Here, the optical axis direction refers to a vertical direction with respect to the lens barrel 100. One or more lens may be stacked by the number according to a design of the lens barrel 100 and may have the same or different optical characteristics such as a refractive index. In an example, the lens barrel 100 is disposed within the housing 200 and coupled to the housing 200. The lens barrel 100 may be moved in one direction, specifically, in the optical axis direction, for auto-focusing within the housing 200.

The housing 200 houses the lens barrel 100 such that the lens barrel 100 moves in the optical axis direction. Thus, the housing 200 may have an internal space for accommodating the lens barrel 100. The lens barrel 100 may have at least one ball bearing 110 provided in the optical axis direction, as a guiding unit guiding movement of the lens barrel 100 when the lens barrel 100 is moved in the optical axial direction within the housing 200.

In an example, the ball bearing 110 is disposed between the lens barrel 100 and the housing 200 to guide movement of the lens barrel 100 in the optical axial direction through a rolling motion. To guide movement of the lens barrel 100 in the optical axial direction, the ball bearing 110 may come into contact with an external surface of the lens barrel 100 and an internal surface of the housing 200. When the lens barrel 100 is moved in the optical axial direction within the housing 200, the ball bearing 110 supports the lens barrel 100, and thus, the lens barrel 100 may be moved to be parallel to an optical axis.

The case 400 may be coupled to the housing 200 to form an appearance of the camera module. In an example, the case 400 is coupled to the housing 200 to cover an external surface of the housing 200. The case 400 may shield electromagnetic waves generated while the camera module is being driven. When the camera module is driven, electromagnetic waves are generated, and when the electromagnetic waves are emitted outwardly, another electronic component may be adversely affected by the electromagnetic waves to cause communication disruption or malfunction. In an example, the case 400 is formed of a metal and grounded to a ground pad of a board installed below the housing 200, thus shielding the electromagnetic waves. When the case 400 is formed of a plastic injection-molded product, conductive pigment may be applied to an internal surface of the case 400, or a conductive film or a conductive tape may be adhered to the internal surface of the case 400 to shield electromagnetic waves. In an example, a conductive epoxy is used as the conductive pigment, but various materials having conductivity may be used without departing from the spirit and scope of the illustrative examples described.

Although not shown in FIG. 1, a stopper may be additionally disposed between the case 400 and the lens barrel 100 to limit a movement distance of the lens barrel 100. For example, the stopper disposed below the case 400 may be spaced apart from the lens barrel 100 in the optical axial direction when power is not applied to a driving coil 320. Thus, when power is applied to the driving coil 320 so the lens barrel 100 is moved in the optical axial direction, since a movement distance of the lens barrel 100 is limited by the stopper, the lens barrel 100 may be moved within a range of the space with the stopper. In an example, the stopper is formed of an elastic material to alleviate an impact when the stopper and the lens barrel 100 collide.

In an example, the actuator 300 drives the lens barrel 100 in the optical axial direction. In an example, the actuator 300 includes a magnet 310, a driving coil 320, a driving apparatus 330, and a position calculator 340. As shown in FIG. 1, the actuator 300 may include a board 350.

In an example, the magnet 310 is disposed on one side surface of the lens barrel 100, and the driving coil 320 is disposed on one surface of the board 350 installed in the housing 200 to face the magnet 310. Although not shown in FIG. 1, the actuator 300 may further include a yoke installed on another surface of the board 350 to prevent leakage of magnetic flux occurring between the magnet 310 and the driving coil 320. In an example, the magnet 310 includes two magnetic substances polarized to each other to allow the lens barrel 100 to be easily moved.

In an example, the driving apparatus 330 applies a driving signal to the driving coil 320 to provide driving force to the magnet 310. In an example, the driving apparatus 330 includes a driver integrated circuit (IC) providing a driving signal to the driving coil 320. When the driving signal from the driving apparatus 330 is provided to the driving coil 320, magnetic flux is generated from the driving coil 320 and interacts with a magnetic field of the magnet 310 to generate driving force moving the lens barrel 100 in the optical axial direction according to the Fleming's left hand rule. In an example, the driving apparatus 330 has an H bridge circuit available for bi-directional driving and applies a driving signal to the driving coil 320 according to a voice coil motor scheme.

In an example, the position calculator 340 detects a position of the magnet 310 provided in the lens barrel 100 moved according to driving of the driving apparatus 330, specifically, on one side of the lens barrel 100. In an example, the position calculator 340 provides a detected position of the magnet 310, as a feedback signal to the driving apparatus 330. The driving apparatus 330 finely adjusts the position of the magnet 310 using the feedback signal provided from the position calculator 340. In an example, the position calculator 340 generates an oscillation signal varied in frequency depending on movement of the magnet 310 and detects a frequency of the generated oscillation signal to calculate a position of the magnet 310.

In an example, the driving apparatus 330 and the position calculator 340 are mounted on the board 350 to face the magnet 310, and the board 350 is fixed to the housing 200. In FIG. 1, it is illustrated that the driving apparatus 330 and the position calculator 340 are disposed on an outer side of the driving coil 320. In another example, the driving apparatus 330 and the position calculator 340 may be disposed in a hollow portion provided on an inner side of the driving coil 320. FIG. 1 illustrates an example where the driving apparatus 330 and the position calculator 340 are mounted on one board 350. In another examples, the driving apparatus 330 and the position calculator 340 may be disposed in different manner without departing from the spirit and scope of the illustrative examples described. For example, the driving apparatus 330 and the position calculator 340 may be separately formed on two different boards and the two different boards may be disposed on the opposite side with respect to the lens barrel 100.

Figure 2:
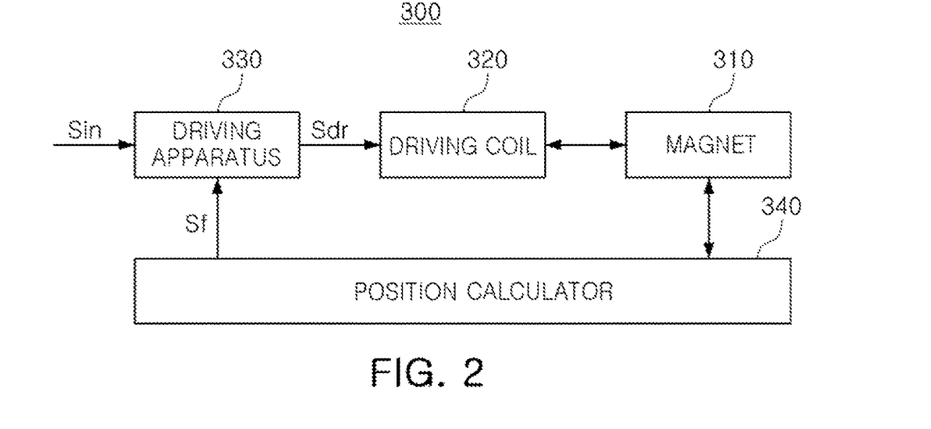
FIG. 2 is a diagram illustrating an example of an actuator employed in a camera module.

FIG. 2 is a diagram illustrating an example of an actuator employed in a camera module.

In an example, the driving apparatus 330 generates a driving signal Sdr according to an input signal Sin input from the outside and a feedback signal Sf generated from the position calculator 340, and provide the generated driving signal Sdr to the driving coil 320. In an example, the input signal Sin may be provided from an image processor performing images processing of an image signal input from an image sensor. An auto-focusing algorithm of the lens barrel may be installed in the image processor.

When performing auto-focusing, the image processor obtains a plurality of image frames from the image sensor, while varying a distance between the lens barrel 100 and the image sensor by moving a position of the lens barrel 100. The image processor may analyze sharpness of each of the plurality of image frames and determine a position of the lens barrel 100 at which sharpness of a frame is maximized, as a target position of the lens barrel 100 for auto-focusing.

When the driving signal Sdr provided from the driving apparatus 330 is applied to the driving coil 320, the lens barrel 100 may be moved in the optical axial direction due to electromagnetic interaction between the driving coil 320 and the magnet 310. In an example, the position calculator 340 detects a current position of the magnet 310 moving according to electromagnetic interaction between the magnet 310 and the driving coil 320 to generate the feedback signal Sf, and provides the feedback signal Sf to the driving apparatus 330.

In an example, the position calculator 340 has at least one sensing coil and converts inductance of the at least one sensing coil changing according to movement of the magnet 310 into a frequency to calculate a position of the magnet 310.

Figure 3:
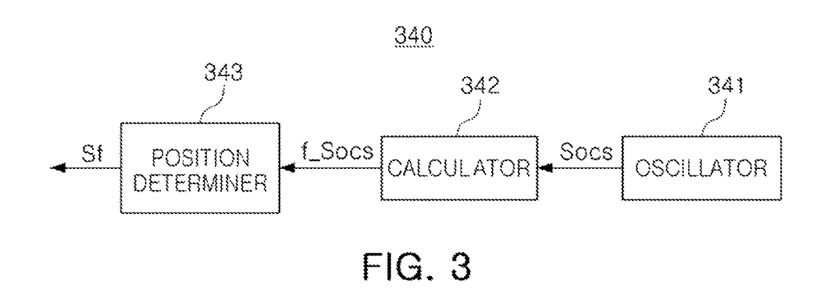
FIG. 3 is a diagram illustrating an example of a position calculator employed in an actuator.

FIG. 3 is a diagram illustrating an example of a position calculator.

Hereinafter, an operation of calculating a position of the magnet 310 by the position calculator 340 will be described with reference to FIGS. 2, 3, and 4. The position calculator 340 includes an oscillator 341, a calculator 342, and a position determiner 343.

In an example, the oscillator 341 includes an oscillation circuit and generate an oscillation signal Sosc. In an example, the oscillation circuit includes at least one sensing coil and may further include at least one of a capacitor or a resistor. In an example, the oscillation circuit includes an LC oscillator including at least one sensing coil and at least one capacitor. In another example, the oscillation circuit includes a widely known Colpitts oscillator. In an example, a frequency of the oscillation signal Sosc generated by the oscillation circuit is determined by inductance of the at least one sensing coil.

When the oscillation circuit is realized as the LC oscillator including a sensing coil and a capacitor, a frequency f of the oscillation signal Sosc may be expressed by Equation 1 below. In Equation 1, I denotes inductance of the sensing coil and c denotes capacitance of the capacitor.

$$f = \frac{1}{2\pi\sqrt{lc}}$$ [Equation 1]

When the magnet 310 is moved by driving force provided from the driving apparatus 330, strength of a magnetic field of the magnet 310 affecting inductance of the one or more sensing coil of the oscillation circuit is changed to change inductance of the sensing coil L. Thus, a frequency of the oscillation signal Sosc output from the oscillator 341 may be varied according to movement of the magnet 310.

According to an example, in order to increase a variation rate of inductance of the sensing coil of the oscillator 341 according to movement of a position of the magnet 310, pigment formed of a magnetic substance or a magnetic material with high magnetic permeability may be provided between the magnet 310 and the oscillator 341.

In an example, the calculator 342 calculates a frequency f_Sosc of the oscillation signal Sosc generated by the oscillator 341. For example, the calculator 342 calculates the frequency f_Sosc of the oscillation signal Sosc using a reference clock CLK. The calculator 342 may count the oscillation signal Sosc by the reference clock CLK, and calculate the frequency f_Sosc of the oscillation signal Sosc using the counted number of reference clocks CLK and a frequency of the reference clock CLK. For example, the calculator 342 may count the oscillation signal Sosc during a reference section by the reference clock CLK.

The position determiner 343 receives the frequency f_Sosc of the oscillation signal Sosc from the calculator 342 and determines a position of the magnet 310 according to the frequency f_Sosc of the oscillation signal Sosc. The position determiner 343 may have a memory and position information of the magnet 310 corresponding to the frequency f_Sosc of the oscillation signal Sosc may be stored in the memory. The memory may be realized as a non-volatile memory including one of a flash memory, electrically erasable programmable read-only memory (EEPROM), and ferroelectric random access memory (FeRAM). Additional description of the memory is provided below. When the frequency f_Sosc of the oscillation signal Sosc is transmitted from the calculator 342, the position determiner 343 may determine a position of the magnet 310 according to the position information of the magnet 310 previously stored in the memory, and generate a feedback signal Sf corresponding to the determined position.

The actuator of the camera module may precisely detect a position of the magnet according to a change in inductance of the sensing coil, without employing a hall sensor.

Referring to FIG. 2, when the feedback signal Sf is provided to the driving apparatus 330, the driving apparatus 330 compares the input signal Sin and the feedback signal Sf and again generates a driving signal Sdr. In an example, the driving apparatus 330 may be driven as a closed-loop type to compare the input signal Sin and the feedback signal Sf. The closed-loop type driving apparatus 330 may be driven to reduce an error between a target position included in the input signal Sin and a current position included in the feedback signal Sf. Closed-loop type driving enhances linearity, accuracy, and repeatability, compared to an open loop type driving.

Figure 4:
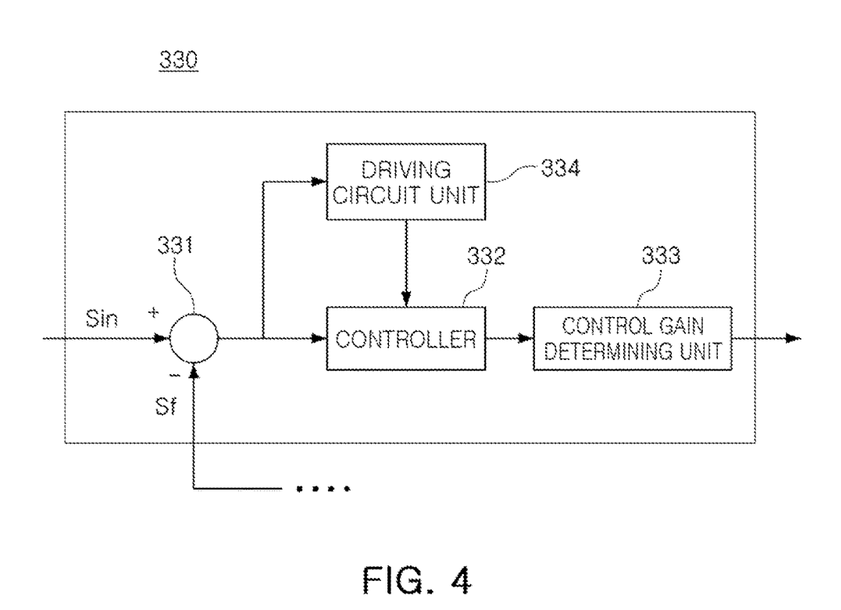
FIG. 4 is a diagram illustrating an example of a driving apparatus employed in an actuator.

FIG. 4 is a diagram illustrating an example of a driving apparatus employed in an actuator.

The driving apparatus 330 may include a comparator 331, a control gain determiner 333, a controller 332, and a driving circuit unit 334.

In an example, the comparator 331 compares the input signal Sin with the feedback signal Sf. In an example, the comparator 331 calculates an error value by comparing a target position of the lens barrel 100 included in the input signal Sin and a current position of the lens barrel 100 included in the feedback signal Sf. In an example, a movement distance and a movement direction of the lens barrel 100 is determined by the error value calculated by the comparator 331.

In an example, the controller 332 generates a control signal by applying a control gain to the error value provided from the comparator 331. In an example, the controller 332 may have a proportional-integral-derivative (PID) controller and perform PID controlling. The controller 332 may perform controlling in proportion to a magnitude of the error value in a current state according to the proportional controlling, perform controlling to reduce an error in a steady state according to integral controlling, and perform controlling to reduce overshoot by preventing a rapid change according to derivative controlling.

The PID controlling may be expressed by Equation 2 below. $K_P$ denotes a proportional control gain, $K_I$ denotes an integral control gain, and $K_D$ denotes a derivative control gain.

$$u(t) = K_P e(t) + K_I \int e(t)dt + K_D \frac{de(t)}{dt} \quad \text{[Equation 2]}$$

When performing PID controlling, the controller 332 may generate a control signal by applying each of the proportional control gain $K_P$, the integral control gain $K_I$, and the derivative control gain $K_D$ to the error value corresponding to a difference between the target position of the lens barrel 100 and the current position of the lens barrel 100.

The driving circuit unit 334 generates a driving signal according to a control signal provided from the controller 332. In an example, the lens barrel 100 is moved to the target position by the driving signal generated by the driving circuit unit 334. In an example, the driving circuit unit 334 may have an H bridge circuit which can be driven bi-directionally therein, and apply a driving signal to the driving coil 320 according to a voice coil motor scheme. When the driving circuit unit 334 is driven in the voice coil motor manner, the control signal provided from the controller 332 may be applied to a gate of a switching element constituting the H bridge circuit.

Figure 5:
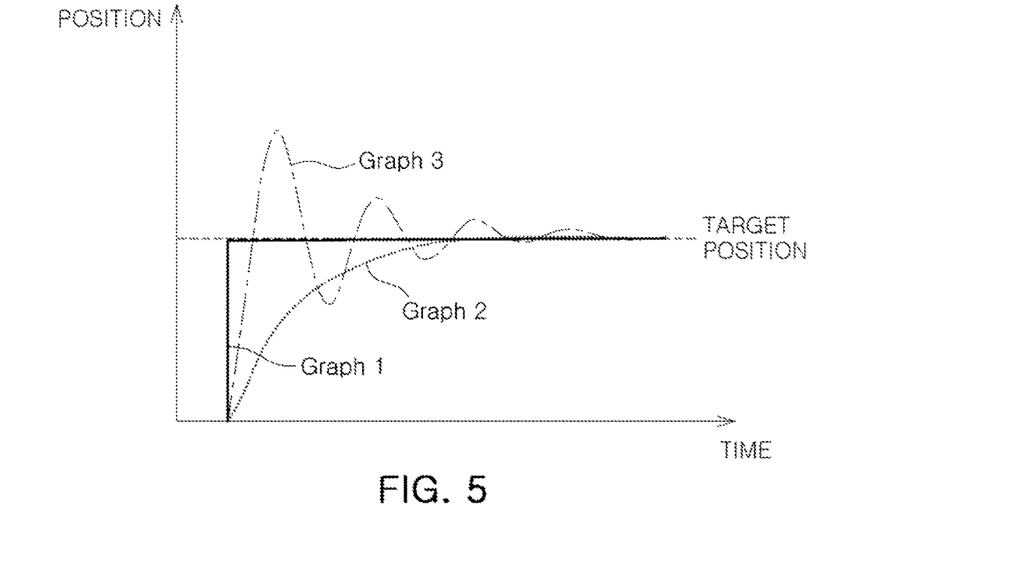
FIG. 5 is a diagram illustrating an example of a proportional-integral-derivative (PID) control scheme according to control gains.

FIG. 5 is a diagram illustrating an example of a PID control scheme according to control gains.

In FIG. 5, a first graph (Graph 1) is a graph representing an ideal PID control scheme to reach a target position, a second graph (Graph 2) is a graph representing a PID control scheme of over-damping having a control gain lower than a threshold level, and a third graph (Graph 3) is a graph representing a PID control scheme of under-damping having a control gain equal to or higher than the threshold level.

Referring to the second graph (Graph 2), in cases where the control gain is set to be lower than the threshold level, overshoot may be removed but a rise time corresponding to a time required for the current position to reach the target position of 90% from 10% is increased. Also, referring to the third graph (Graph 3), in cases where the control gain is set to be equal to or higher than the threshold level, the rise time may be reduced but overshoot occurs. When overshoot occurs, a settling time may be lengthened and oscillation may occur in the camera module.

The driving apparatus of the camera module employs the control gain determiner 333 determining a control gain according to an error value to solve the foregoing problem.

In an example, the control gain determiner 333 determines a control gain from an error value provided from the comparator 331, and provides the determined control gain to the controller 332. The controller 332 may generate a control signal according to the error value provided from the comparator 331 and the control gain determined by the control gain determiner 333.

The control gain determiner 333 determines a control gain according to a movement distance determined from the error value. For example, when the controller 332 performs PID controlling, the control gain determiner 333 may determine each of a proportional control gain $K_P$, an integral control gain $K_I$, and a derivative control gain $K_D$.

Figure 6:
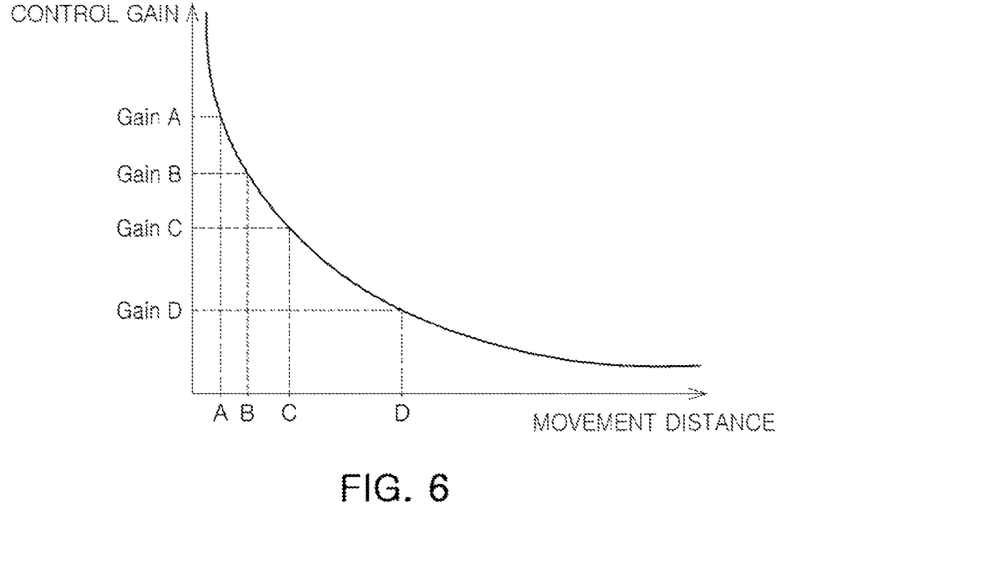
FIG. 6 is a diagram illustrating an example of a relationship between movement distance and control gain.

FIG. 6 is a diagram illustrating an example of a relationship between movement distance and control gain.

The control gain determiner 333 may determine a control gain according to a movement distance determined from an error value.

When a movement distance is reduced, the control gain determiner 333 may increase a control gain. Over-damping of the second graph (Graph 2) of FIG. 5 occurs due to frictional force when the camera module is initially driven. The control gain determiner 333 may overcome such frictional force at the initial driving of the camera module by increasing a control gain when a movement distance is reduced. In this manner, over-damping occurring when a movement distance is small is eliminated.

Also, when a movement distance is increased, the control gain determiner 333 may reduce a control gain. Under-damping such as the third graph (Graph 3) of FIG. 5 occurs due to acceleration generated when the camera module is driven. When a movement distance is increased, the control gain determiner 333 reduces a control gain to suppress acceleration generated when the camera module is driven. In this manner, under-damping occurring when a movement distance is large may be eliminated.

A control gain determined by the control gain determiner 333 may be in a substantially inversely proportional relation to a movement distance. The aforementioned substantially inversely proportional relation may include a case in which a slope of a control gain regarding a movement distance illustrated in FIG. 6 is reduced in a linear or convex shape, as well as a case in which the slope of the control gain regarding the movement distance illustrated in FIG. 6 is reduced in a concave shape exponential functionally. Referring to FIG. 6, it can be seen that, when a movement distance is increased from a movement distance A to a movement distance D, control gains A to D (Gain A to Gain D) corresponding to movement distances A to D are reduced.

The control gain determiner 333 may increase a control gain when a movement distance is reduced, and reduce a control gain when a movement distance is increased, thus removing overshoot, while reducing a rise time.

As set forth above, a control gain is increased when a movement distance of the magnet is reduced, and reduced when a movement distance of the magnet is increased, whereby overshoot may be removed, while reducing a rise time. In addition, a position of the magnet may be precisely detected according to a change in inductance of the sensing coil, without employing a hall sensor.

An aspect of the present disclosure provides an actuator and a driving apparatus of a camera module, capable of determining a control gain according to movement distances.

The stimulator 110, controller 115, stimulator 900, controller 910, feedback detector 920, voltage measurer 930, and other apparatuses, units, modules, devices, and other components illustrated in FIGS. 1-4 that perform the operations described herein are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software includes at least one of an applet, a dynamic link library (DLL), middleware, firmware, a device driver, an application program storing the method of preventing the collision. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions.

While this disclosure includes specific examples, it will be apparent after gaining a thorough understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An actuator of a camera module, the actuator comprising:
   a magnet;
   a driving coil facing the magnet;
   a driving apparatus comprising a driving circuit configured to apply a driving signal to the driving coil to move the magnet; and
   a position calculator configured to generate a feedback signal based on a current position of the magnet,
   wherein the driving apparatus is further configured to calculate an error value by comparing an input signal with the feedback signal, and to determine a control gain of a control signal provided to the driving circuit according to the error value, and
   wherein the control gain is reduced in response to an increase in the error value, and the control gain is increased in response to a decrease in the error value.

2. The actuator of claim 1, wherein the error value is inversely proportional to the control gain.

3. The actuator of claim 1, wherein the control gain is reduced exponential functionally in response to the increase in the error value.

4. The actuator of claim 1, wherein the driving apparatus further comprises a proportional-integral-derivative (PID) controller configured to generate the control signal.

5. The actuator of claim 4, wherein the driving apparatus is further configured to determine each of a proportional control gain, an integral control gain, and a derivative control gain of the PID controller.

6. The actuator of claim 1, wherein the driving apparatus is driven in a closed loop manner to reduce the error value corresponding to a difference between the input signal and the feedback signal.

7. The actuator of claim 1, wherein the input signal comprises a target position of the magnet.

8. The actuator of claim 7, wherein the input signal is provided from an image processor including an auto-focusing algorithm.

9. The actuator of claim 1, wherein the driving apparatus is further configured to provide the driving signal in a voice coil motor manner to the driving coil.

10. The actuator of claim 1, wherein the position calculator is further configured to generate an oscillation signal that is varied in frequency according to movement of the magnet, and to calculate the current position of the magnet according to a frequency of the oscillation signal.

11. The actuator of claim 10, wherein the position calculator comprises a sensing coil configured to determine a frequency of the oscillation signal.

12. The actuator of claim 11, wherein the position calculator further comprises a capacitor forming an oscillation circuit with the sensing coil.

13. The actuator of claim 11, wherein the position calculator further comprises a resister forming an oscillation circuit with the sensing coil.

14. The actuator of claim 11, further comprising a pigment formed of a magnetic substance or a magnetic material with high magnetic permeability disposed between the magnet and the sensing coil.

15. The actuator of claim 11, wherein the frequency of the oscillation signal is determined based on an inductance of the sensing coil.

16. A driving apparatus of a camera module, the driving apparatus comprising: a comparator configured to compare a current position of a magnet with a target position to calculate an error value; a controller configured to generate a control signal according to the error value; a control gain determiner configured to determine a control gain of the control signal according to the error value; and a driving circuit unit configured to provide a driving signal to a driving coil based on the control signal, wherein the control gain determiner is further configured to reduce the control gain in response to an increase in the error value, and to increase the control gain in response to a decrease in the error value.

17. The driving apparatus of claim 16, wherein the error value is inversely proportional to the control gain.

18. The driving apparatus of claim 16, wherein the control gain is reduced exponential functionally, in response to an increase in the error value.

19. The driving apparatus of claim 16, wherein the controller comprises a proportional-integral-derivative (PID) controller, and the control gain determiner is further configured to determine each of a proportional control gain, an integral control gain, and a derivative control gain of the PID controller.

* * * * *